United States Patent [19]

Schoeps

[11] 4,428,240
[45] Jan. 31, 1984

[54] METHOD FOR DETERMINING MAGNITUDE OF LOAD IN AN ELONGATED BOLT HAVING AN ELASTICALLY DEFORMABLE HEAD

[75] Inventor: Knut C. Schoeps, Tyresö, Sweden

[73] Assignee: Atlas Copco AB, Nacka, Sweden

[21] Appl. No.: 388,139

[22] Filed: Jun. 14, 1982

Related U.S. Application Data

[62] Division of Ser. No. 93,911, Nov. 13, 1979.

[30] Foreign Application Priority Data

Nov. 13, 1978 [SE] Sweden .................................. 7811678

[51] Int. Cl.³ .............................................. F16B 31/02
[52] U.S. Cl. ........................................ 73/761; 411/14
[58] Field of Search ......................... 73/761; 411/8, 14

[56] References Cited

U.S. PATENT DOCUMENTS

| | | | |
|---|---|---|---|
| 2,543,705 | 2/1951 | Place | 73/761 X |
| 3,176,359 | 4/1965 | Ward | 411/435 X |
| 3,224,316 | 12/1965 | Grikscheis et al. | 73/761 X |
| 3,415,154 | 12/1968 | Skierski | 411/403 |
| 3,561,260 | 2/1971 | Reynolds | 73/761 |
| 3,718,065 | 2/1973 | Liber | 73/761 X |
| 3,718,066 | 2/1973 | Dally | 411/14 |
| 3,757,630 | 9/1973 | Dahl | 411/4 |
| 3,788,186 | 1/1974 | Crides | 411/8 |
| 3,812,758 | 5/1974 | Bossler | 411/14 |
| 3,886,840 | 6/1975 | Bossler | 73/761 X |
| 3,943,819 | 3/1976 | Charron | 411/14 |

Primary Examiner—Jerry W. Myracle
Attorney, Agent, or Firm—Frishauf, Holtz, Goodman & Woodward

[57] ABSTRACT

A bolt for transmitting axial load having a head provided with a weakening slot for promoting elastic deformation of the head in response to the axial load magnitude. On the head there is a pair of measure points located at each side of the slot in or adjacent the free end surface of the head at a distance between them that decreases at increasing axial load on the bolt. The bolt head also comprises a pair of reference points located either in the same axial plane as the measure points but in a direction perpendicular to the latters or in a plane axially spaced from that of the measure points adjacent the bottom of the weakening slot. The location of the reference points is such that the relative distance between them remains unaffected by the deformation of the bolt head and thereby the axial load transmitted by the bolt. The axial load magnitude is determinable from the difference in distance between the measure points and the reference points, or from the variation in distance between the measure points only measured on the bolt in unloaded condition and under the actual load. A gauge of a conventional design may be used for the measurements required.

2 Claims, 7 Drawing Figures

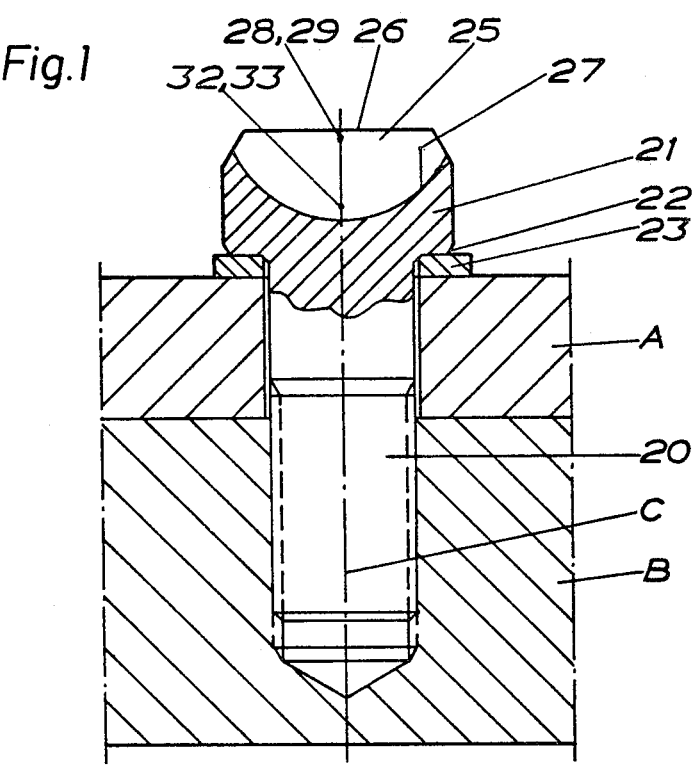
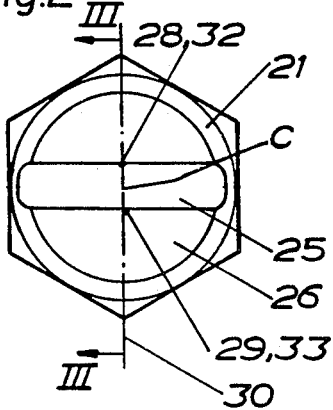
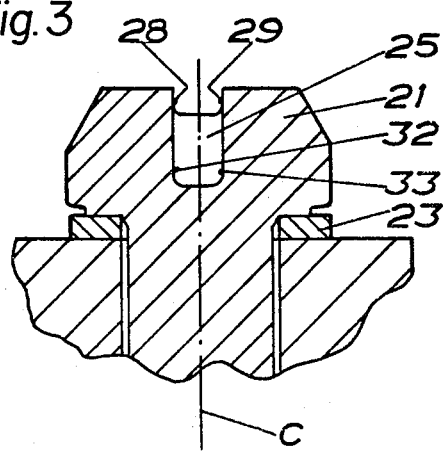

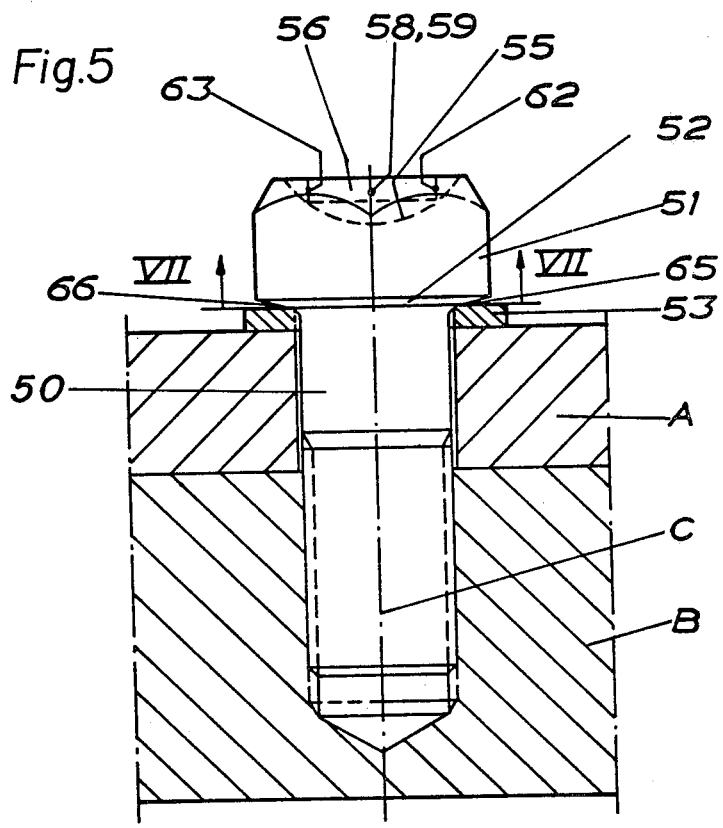
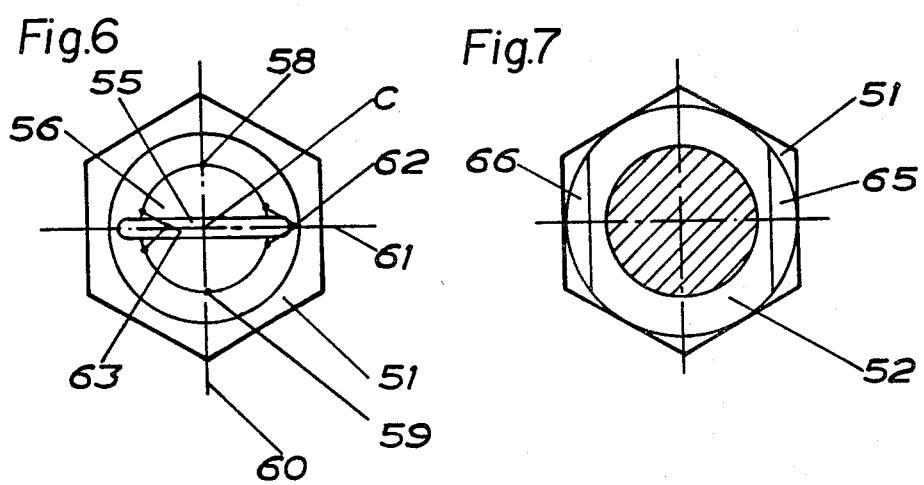

METHOD FOR DETERMINING MAGNITUDE OF LOAD IN AN ELONGATED BOLT HAVING AN ELASTICALLY DEFORMABLE HEAD

This is a division of application Ser. No. 093,911, filed Nov. 13, 1979.

BACKGROUND OF THE INVENTION

This invention relates to a bolt for transmitting axial load and a method for determining the magnitude of the axial load in the bolt. In particular, the invention concerns a bolt of the type having means for measuring the actual load transmitted by the bolt.

In order to obtain a tension measuring or indicating means that is simple and inexpensive and by which a direct and accurate measurement of the bolt tension is obtained, there have been suggested a number of bolt designs by which the elongation of the bolt or the elastic deformation of the bolt head are used to obtain such indication.

One such prior art bolt design is disclosed in U.S. Pat. No. 3,886,840, and comprises a weakened bolt head provided with a coaxial indicator pin and a washer fitted in a recess in the head. The bolt tension is indicated as the relative axial position of the pin and the washer caused by deformation of the bolt head. This prior art bolt design is disadvantageous due to the high manufacturing cost of the bolt, which partly refers to the introduction of an indicator pin and washer assembly and partly to the fact that a mass produced standard dimension bolt cannot possibly be used, since the head of such a bolt is too small to lodge such assembly.

In U.S. Pat. No. 3,718,066 there is disclosed another prior art bolt design by which the bolt tension may be indicated. For that purpose, the bolt head is provided with a photoelastic strip which is exposed to bending stresses as the bolt head is elastically deformed and generates a number of fringes responsive to the tension in the bolt. Thus generated fringes are visible in polarized light only and has to be counted manually. This means that the bolt tension is not measurable during tightening of the bolt if using a socket wrench since the photoelastic strip is then not visible. Moreover, the photoelastic strip has very little resistance against mechanical damage which may jeopardize later tension checks.

In U.S. Pat. No. 3,788,186, there is disclosed still another prior art tension bolt provided with stress indicating means. The bolt head is provided with one or more cavities in which are inserted piecies of brittle material. Due to the axial load in the bolt, the head is deformed such that its upper region is compressed, and, when reaching a certain tension level in the bolt, the brittle pieces are crushed which is easily noticable. This stress indicating means, however, is disadvantageous in that it does not enable a later bolt tension check. Neither does it indicate decreasing bolt tension.

An object of the present invention is to avoid the problems concerned with the above related prior art devices and to provide a simple and inexpensive bolt for transmitting axial load of a magnitude indicated by a direct measurable elastic deformation of the bolt head.

BRIEF DESCRIPTION OF THE DRAWINGS

FIG. 1 shows partly in section a side elevation of a bolt according to the invention in association with two construction elements to be clamped together, FIG. 2 shows an end view of the bolt of FIG. 1, FIG. 3 shows a longitudinal section through the bolt of FIG. 1, taken along line III—III in FIG. 2.

FIG. 5 shows a side elevation of a bolt according to another embodiment of the invention in association with two construction elements to be clamped together, FIG. 6 shows an end view of the bolt of FIG. 4, and FIG. 7 shows a cross section through the bolt of FIG. 5, viewed as from line VII—VII.

DETAILED DESCRIPTION

Figure 4:
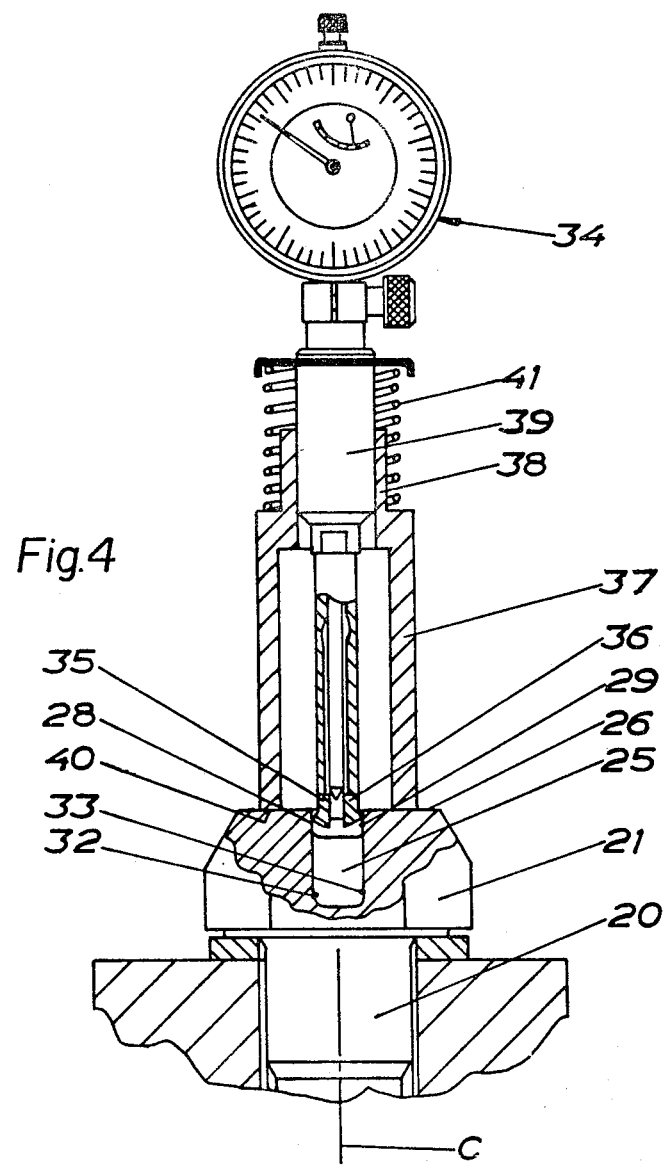
FIG. 4 shows partly in section a bolt according to the embodiment shown in FIG. 1 and a dial gauge applied thereon.

In FIG. 1 there is shown a screw joint comprising a bolt 20 clamping together an element A provided with a free running hole and an element B having an internal thread cut in a bottom hole. The bolt 20 comprises a hexagonal head 21 to be engaged by for instance by a socket wrench for applying a tightening torque on the bolt. At its lower end the head 21 has an annular contact surface 22 by which the clamping force exerted by the bolt 20 is transferred to element A. Between the head 21 and element A there is a washer 23.

The head 21 is formed with a transverse slot 25 extending through the upper, free end surface 26 thereof. The slot 25 has an arc-shaped bottom 27 which has its deepest portion in the centre of the bolt. The purpose of the slot 25 is to form a weakening of the head 21 and, thereby, to promote a transverse elastic deformation of the latter due to the tension existing in the bolt. Because of the slot 25, the head 21 is weakened in one well defined direction, which means that a deformation of the head is obtained perpendicularly to the slot 25, whereas substantially no deformation at all takes place in the direction of the slot 25.

The basic idea of the present invention is to provide a bolt on which the existing axial load magnitude is measurable as a transverse deformation of the head or more precisely a compression of the slot 25.

Accordingly, the bolt head 21 is provided with a pair of measure points 28,29 located on opposite sides of the slot 25 along a straight line 30 extending perpendicularly relative to the latter as well as to the bolt axis C. The measure points 28,29 are situated close to the upper end surface 26 of the head 21 where the compression of the slot 25 has its biggest magnitude. The distance between the two measure points 28, 29 decreases in response to increased axial load transmitted by the bolt.

By measuring the distance between points 28 and 29 on the bolt when transmitting a load and comparing it with the same distance at unloaded bolt, there is obtained a difference which according to experience data for the bolt in question is translatable into the actual bolt load.

Another way of determining the bolt head deformation and thereby the load transmitted by the bolt is to measure the distance between a pair of reference points 32, 33 situated at the bottom of the slot 25. The reference points 32, 33 are located in a plane axially spaced from the plane in which the measure points 28, 29 are located. At the deepest portion of the slot bottom 27, i.e. the portion that is most far off from the upper end surface 26 of the head, the slot 25 has no weakening effect upon the head 21. This means that substantially no deformation of the head 21 takes place at that location and the distance between the reference points 32, 33 remains uneffected by the load transmitted by the bolt 20.

By using reference points for determining the deformation rate of the bolt head 21, it is possible to check the axial load in a bolt tightened at an earlier point of time.

Measuring of the relative distances between points 28, 29 and points 32, 33 is carried out by means of a dial gauge 34 of a conventional type. In FIG. 4, the contact jaws 35, 36 of the dial gauge 34 are brought into contact with the measure points 28, 29 just below the upper end surface 26 of the head 21, whereby the distance between the measure points is determined. By moving the dial gauge 34 downwards along the axis C of the bolt 20, the contact jaws are brought into alignment with the reference points 32, 33 and a reference value is obtainable.

In order to ensure a proper alignment between the dial gauge 34 and the axis C of the bolt 20, the former is provided with a guide sleeve 37. The latter has an upper neck portion 38 which is telescopically supported on a cylindrical portion 39, of the dial gauge 34. At its lower end the guide sleeve 37 is formed with an annular contact surface 40 for taking support against the upper end surface 26 of the bolt head 21. A spring 41 biases the guide sleeve 37 downwardly relative to the dial gauge 34.

Alternatively, the deformation rate of the bolt head 21 may be determined by using the original width of the slot prior to the tightening of the bolt as a reference value and only measure the actual distance between the measure points 28, 29. In that case the penetration depth of an axially movable conical measure point into the slot opening would be enough to determine the actual deformation rate and the bolt load being transmitted.

This method is suitable to use in connection with power tools, since the introduction of an axially movable measure point does not seriously influence the design of presently available tools, and the conical measure point is not dependent on any particular relative angular position between the tool socket and the bolt head.

In FIG. 5, there is shown a screw joint in which the clamping force is accomplished by a bolt according to another embodiment of the invention. Elements A and B are clamped together by a bolt 50 having a hexagonal head 51. The latter has a annular contact surface 52 by which the axial load of the bolt 50 is transmitted to element A via a washer 53.

The head 51 comprises a central arc shaped slot 55 which forms a weakening portion in the head. As in the above described embodiment this weakening portion is intended to promote a directed transverse deformation of the head 51 as the bolt 50 is exposed to an axial load such that the upper part of the slot 55 gets narrower under load.

The bolt head 51 further comprises a shallow, cylindrical depression 56 which is coaxial with the bolt axis C. On the cylindrical surface of this depression 56, there is arranged a pair of opposed measure points 58, 59 disposed along a straight line 60 extending perpendicularly to the bolt axis C as well as to the slot 55.

The cylindrical depression 56 makes it possible not only to arrange a pair of measure points 58, 59 but also a pair of reference points 62, 63. The latters are located in the same plane as the measure points 58, 59, but they are disposed along a straight line 61 which is perpendicular to the straight line 60 of the measure points 58, 59 as well as to the bolt axis C. As the slot 55 extends in the same direction as the location line 61 of the reference points 62, 63, the latters have to be spread out to both sides of the slot 55 and a measure device having contact jaws bridging over the slot 55 has to be used.

According to this embodiment of the invention, the measure points 58, 59 and the reference points 62, 63 are arranged so as to utilize the fact that all deformation of the head 51 takes place in a direction perpendicular to the weakening slot 55 whereas substantially no deformation at all occurs in the direction of the slot 55. This means that the distance between the reference points 62, 63 remains unaffected by the bolt load and can be measured and referred to at any point of time, before, during or after the load application on the bolt.

In order to ensure that all deformation bending of the head really takes place perpendicularly to the slot 55, the annular contact surface 52 of the bolt head 51 is formed with two parallel bevelled portions 65, 66 extending transversly to the direction of the slot 55. Thereby, the main part of the load transmission between the bolt head 51 and the washer 53 is applied to sections of the contact surface 52 situated on opposite sides of the slot plane so as to amplify the bending effect on the head 51 transversely of the slot 55.

I claim:
1. Method for determining the actual load magnitude in an elongated bolt having a head which is elastically deformable in a known relation to the bolt load magnitude, the head having a transverse weakening slot extending substantially in the direction of the longitudinal axis of the bolt; a circular cylindrical depression substantially coaxial with said longitudinal axis and extending from the top of the head to a depth smaller than the depth of said slot; a pair of diametrically opposed measure points disposed along a straight line extending perpendicular to the lengthwise direction of said slots and on opposite sides of said slot; and a pair of diametrically opposed reference points (62,63) located on said peripheral wall of said cylindrical depression (56) and disposed along a straight line (61) extending substantially parallel to said slot (55) such that the relative distance between the reference points (62,63) remains substantially unaffected by the axial load transmitted by the bolt;

comprising the steps of:
(a) measuring a first diameter of said depression between said reference points in a direction substantially parallel to said slot;
(b) measuring a second diameter of said depression between said measure points in a direction substantially perpendicular to said slot while said bolt is under load; and
(c) determining the load responsive bolt head formation by calculating the difference between said measured first diameter and said measured second diameter, said load responsive bolt head deformation being a predetermined function of said calculated difference.

2. The method of claim 1, further comprising providing two substantially parallel bevelled portions (65,66) in a contact surface (52) of said head which is opposed to said top of said head, said bevelled portions extending substantially tranversely to said slot (55) and being angled away from said bolt to reduce the effective size of said contact surface and to amplify a bending effect on said head transversely of said slot.

* * * * *